US008094591B1

(12) United States Patent
Hunter et al.

(10) Patent No.: US 8,094,591 B1
(45) Date of Patent: Jan. 10, 2012

(54) DATA CARRIER DETECTOR FOR A PACKET-SWITCHED COMMUNICATION NETWORK

(75) Inventors: Anthony Hunter, Melbourne (AU); Justin Lindorff, Melbourne (AU)

(73) Assignee: Good Technology, Inc., Sunnyvale, CA (US)

( * ) Notice: Subject to any disclaimer, the term of this patent is extended or adjusted under 35 U.S.C. 154(b) by 2698 days.

(21) Appl. No.: 10/117,492

(22) Filed: Apr. 4, 2002

Related U.S. Application Data

(60) Provisional application No. 60/365,413, filed on Mar. 19, 2002.

(51) Int. Cl.
*H04B 7/00* (2006.01)

(52) U.S. Cl. ........................................ 370/310; 375/320

(58) Field of Classification Search .................. 370/445; 375/316

See application file for complete search history.

(56) References Cited

U.S. PATENT DOCUMENTS

| | | | | |
|---|---|---|---|---|
| 3,858,003 | A * | 12/1974 | Scoubis | 348/532 |
| 4,163,909 | A * | 8/1979 | Harr | 327/59 |
| 4,529,964 | A * | 7/1985 | Minami et al. | 341/13 |
| 4,620,286 | A * | 10/1986 | Smith et al. | 706/12 |
| 5,083,091 | A * | 1/1992 | Frick et al. | 324/678 |
| 5,091,920 | A * | 2/1992 | Ikeda et al. | 375/317 |
| 5,408,695 | A * | 4/1995 | Dorr | 455/226.1 |
| 5,953,418 | A * | 9/1999 | Bock et al. | 380/240 |
| 6,058,101 | A * | 5/2000 | Huang et al. | 370/208 |
| 6,211,670 | B1 * | 4/2001 | DeWilde et al. | 324/207.21 |
| 6,286,071 | B1 * | 9/2001 | Iijima | 710/124 |
| 6,359,939 | B1 * | 3/2002 | Calderone | 375/316 |
| 6,577,608 | B1 * | 6/2003 | Moon et al. | 370/311 |
| 6,615,301 | B1 * | 9/2003 | Lee et al. | 710/106 |
| 2003/0002563 | A1 * | 1/2003 | Kansakoski et al. | 375/130 |
| 2003/0031267 | A1 * | 2/2003 | Hietala | 375/295 |
| 2003/0043855 | A1 * | 3/2003 | Yamamoto et al. | 370/503 |
| 2003/0081741 | A1 * | 5/2003 | Anne et al. | 379/93.01 |
| 2003/0171108 | A1 * | 9/2003 | Eichin et al. | 455/307 |
| 2004/0014439 | A1 * | 1/2004 | Matsugatani et al. | 455/126 |
| 2004/0120424 | A1 * | 6/2004 | Roberts | 375/327 |
| 2005/0031097 | A1 * | 2/2005 | Rabenko et al. | 379/93.31 |
| 2005/0053049 | A1 * | 3/2005 | Blanz et al. | 370/350 |

* cited by examiner

*Primary Examiner* — Chi Pham
*Assistant Examiner* — Mohammad Adhami
(74) *Attorney, Agent, or Firm* — Knobbe, Martens, Olsen & Bear LLP

(57) ABSTRACT

A data carrier detector for a packet-switched communication network. The detector includes an envelope detector to provide peak-to-peak amplitude of an incoming waveform at any given time, a peak-to-peak amplitude monitor to monitor peak-to-peak amplitude, and to set a trigger when the peak-to-peak amplitude changes by a predetermined amount. The detector also includes a data packet searcher to start searching for a data packet when the peak-to-peak amplitude monitor issues the trigger. The detector further includes a data packet processor to process and extract information from the recovered data packet.

15 Claims, 6 Drawing Sheets

110

302 304 306 308

INPUT WAVEFORM → ENVELOPE DETECTOR → PEAK-TO-PEAK AMPLITUDE MONITOR → DATA PACKET SEARCHER → DATA PACKET PROCESSOR → DATA

DATA CARRIER DETECTOR FOR A PACKET-SWITCHED COMMUNICATION NETWORK

CROSS-REFERENCE TO RELATED APPLICATION

This application claims benefit of the priority of U.S. Provisional Application No. 60/365,413, filed Mar. 19, 2002, and entitled "Data Carrier Detector for a Packet-Switched Communication Network."

BACKGROUND

The invention relates to a packet-switched communication network. More particularly, the invention relates to a data carrier detector for such a network.

Packet-switched communication networks evolved from the need to conserve data communication resources. Since data is sent in discrete packets, rather than as a continuous transmission, gaps in communication on one connection may be efficiently utilized by providing packets from other connections to fill those gaps. An example of a radio communication system, which utilizes packet data communications to communicate information between a sending station and a receiving station, includes a Mobitex™ system.

A Mobitex system is a multi-user system formed of a Mobitex network and a plurality of mobile radio modems. Information to be communicated to a mobile radio modem is formatted into frames of data, each frame of data forming a packet which may be transmitted to the mobile radio modem through a radio communication channel. Sequences of frames are transmitted to the mobile radio modem to effectuate the communication of significant amounts of information to the mobile radio modem. When the mobile radio modem receives a message frame, the modem transmits, back to the Mobitex network, an acknowledgment signal, acknowledging reception of the message frame.

However, because a radio communication channel is not an ideal channel, the message frames transmitted upon such channels are susceptible to signal quality degradation. Such signal quality degradation may occur, for example, due to interference or noise introduced upon the signal channel, excessive separation distance between the Mobitex network and the mobile modem, or other communication problems. If the signal quality degradation is significant, a message frame transmitted by the Mobitex network may not even be detected by the mobile radio modem.

SUMMARY

In one aspect, a data carrier detector is described. The detector includes an envelope detector to provide peak-to-peak amplitude of an incoming waveform at any given time, a peak-to-peak amplitude monitor to monitor peak-to-peak amplitude, and to set a trigger when the peak-to-peak amplitude changes by a predetermined amount. The detector also includes a data packet searcher to start searching for a data packet when the peak-to-peak amplitude monitor issues the trigger. The detector further includes a data packet processor to process and extract information from the recovered data packet.

In another aspect, a method for detecting a difference between idle channel and incoming received data is described. Peak-to-peak amplitude of an incoming waveform at any given time is initially determined and monitored. A trigger is set when the peak-to-peak amplitude changes by a predetermined amount. A data packet is then searched when the trigger is issued. Finally, information is processed and extracted from the recovered data packet.

DETAILED DESCRIPTION

In recognition of the above-stated problems associated with prior art methods and systems for detecting data frames in a packet-switched communication network, embodiments for an improved method and system for detecting the difference between idle channel and incoming received data are described. Specifically, the embodiments are illustrated using examples of the method and system designed for a mobile radio modem used in a Mobitex network. However, the method and system described below may be used in other similar systems and networks. Consequently, for purposes of illustration and not for purposes of limitation, the exemplary embodiments of the invention are described in a manner consistent with such use, though clearly the invention is not so limited.

A Mobitex network is a packetized wireless 900-MHz wide area network (WAN) that allows mobile/portable subscribers to transfer data, including e-mail, through the network infrastructure. Thus, communication of the information between the sending and receiving stations in the Mobitex network may be effectuated by formatting the information into packets of data. Once formatted into packets, the information may be transmitted to the receiving station in discrete bursts, formed of a single packet, or a series of packets, to the receiving station. Furthermore, the network operates with an 8-kbps (kilobits/sec) data rate using Gaussian minimum shift-keying (GMSK) modulation. User terminals are typically portable or mobile devices that encompass one or more applications and any additional protocol layers necessary to send and receive data on the network. Within the user terminal, the interface between the radio (physical layer) and other layers is a GMSK modem. During transmission, the modem converts packets of network data into transmit baseband. For receiving, the modem demodulates similar waveforms into data decisions.

Figure 1:
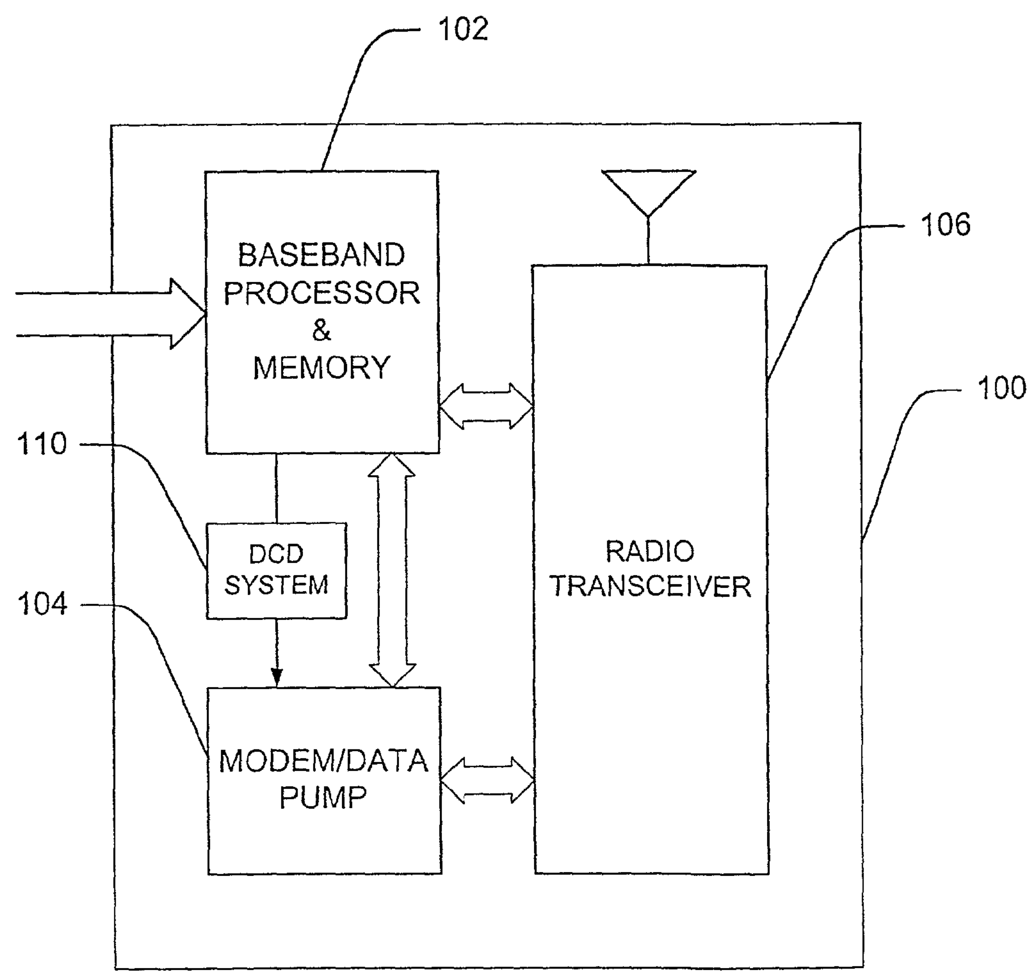
FIG. 1 illustrates a Mobitex radio system in accordance with one embodiment of the invention.

A Mobitex radio system 100 in accordance with an embodiment of the invention is illustrated in FIG. 1. The radio system 100 includes at least one baseband processor and memory 102, a data carrier detector system 110, a modem/data pump 104, and a radio transceiver 106. The radio system 100 may include other similar elements, in addition to and/or in place of the above listed elements, to perform similar functions. The baseband processor and memory 102, the modem/data pump 104, and/or, the radio transceiver 106 may be implemented using existing devices. The data carrier detector system 110 (described below in detail in conjunction with FIGS. 3 through 5) may be implemented in software, hardware, or in combination of both software and hardware. Furthermore, in one alternative embodiment, the implementation of the detector system 110 may reside in the baseband processor 102. In another alternative embodiment, the detector system 110 may reside in the modem/data pump 104.

The radio system 100 runs the protocol, controls the radio transceiver 106, and communicates digital data across the radio path using GMSK modulation. However, a radio system using a traditional GMSK modem/data pump and data detector system performed poorly in detecting the difference between idle channel and incoming received data. Some of the reasons for the poor performance of these traditional devices are described below in detail.

Figure 2A:
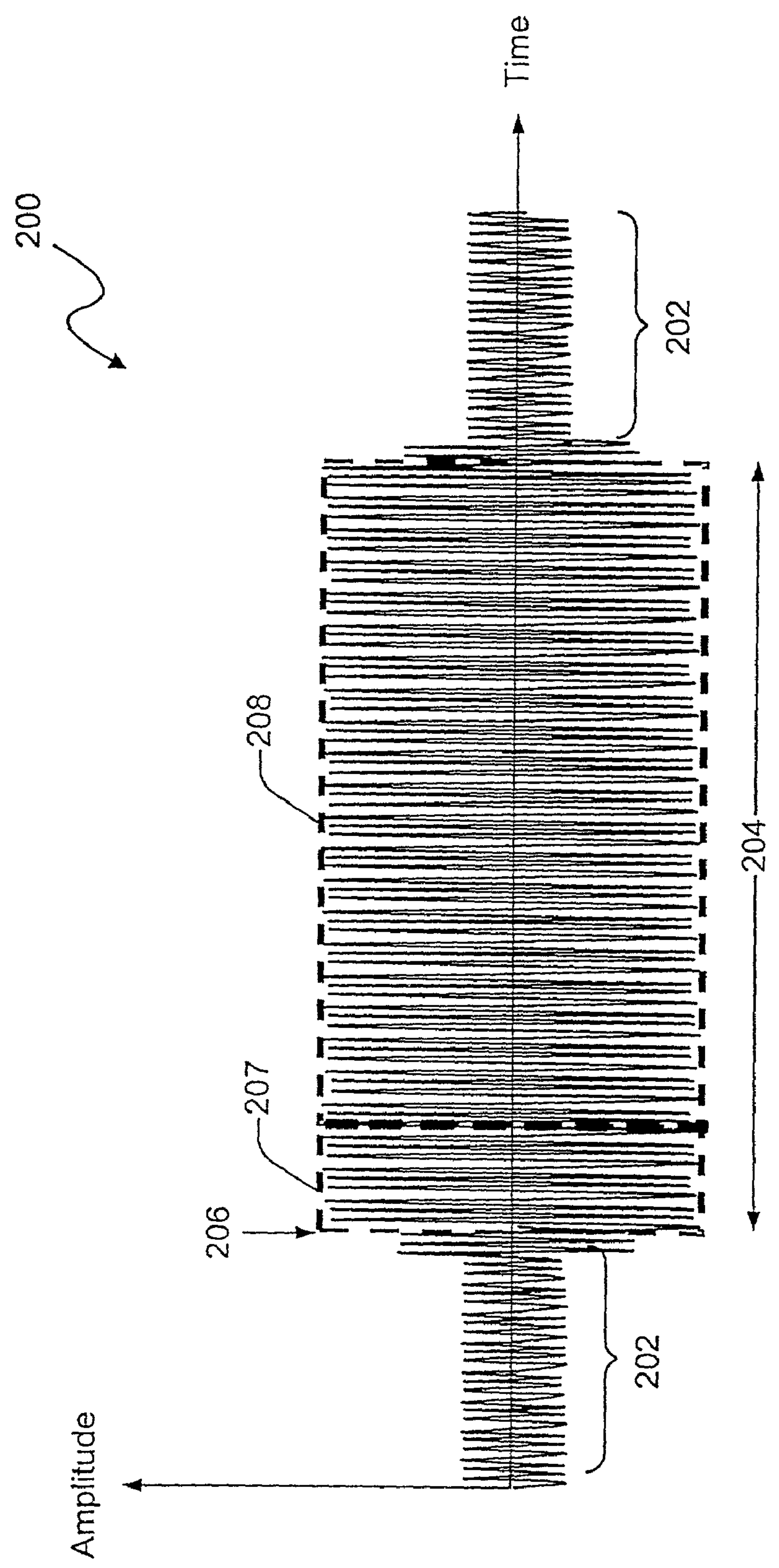
FIG. 2A shows a typical signal waveform transmitted across a Mobitex network.

FIG. 2A shows a typical signal waveform 200 transmitted across a Mobitex network. In the illustrated figure, the waveform 200 includes some portions (e.g. 202) where the channel is idle but contains noise, and other portions (e.g. 204) where the incoming packetized data 208 occupies the channel with relatively strong signal compared to the noise. Hence, the start 206 of an incoming data packet 208 may be readily detected by continuously searching for a frame head 207. Once the frame head 207 has been found, the conventional modem/data pump operates to retrieve the entire data packet.

However, as described above, because a radio communication channel is not an ideal channel, the message frames transmitted on such channel are susceptible to signal quality degradation. Such signal quality degradation may occur, for example, due to interference or noise introduced upon the signal channel, excessive separation distance between the Mobitex network and the mobile modem, or other communication problems. Another particularly challenging situation presented by a non-ideal channel occurs when multipath interference and receiver shadowing reduce received signal strength (RSS), resulting in a reduction of input signal amplitude required to drive the synchronization feedback system.

Figure 2B:
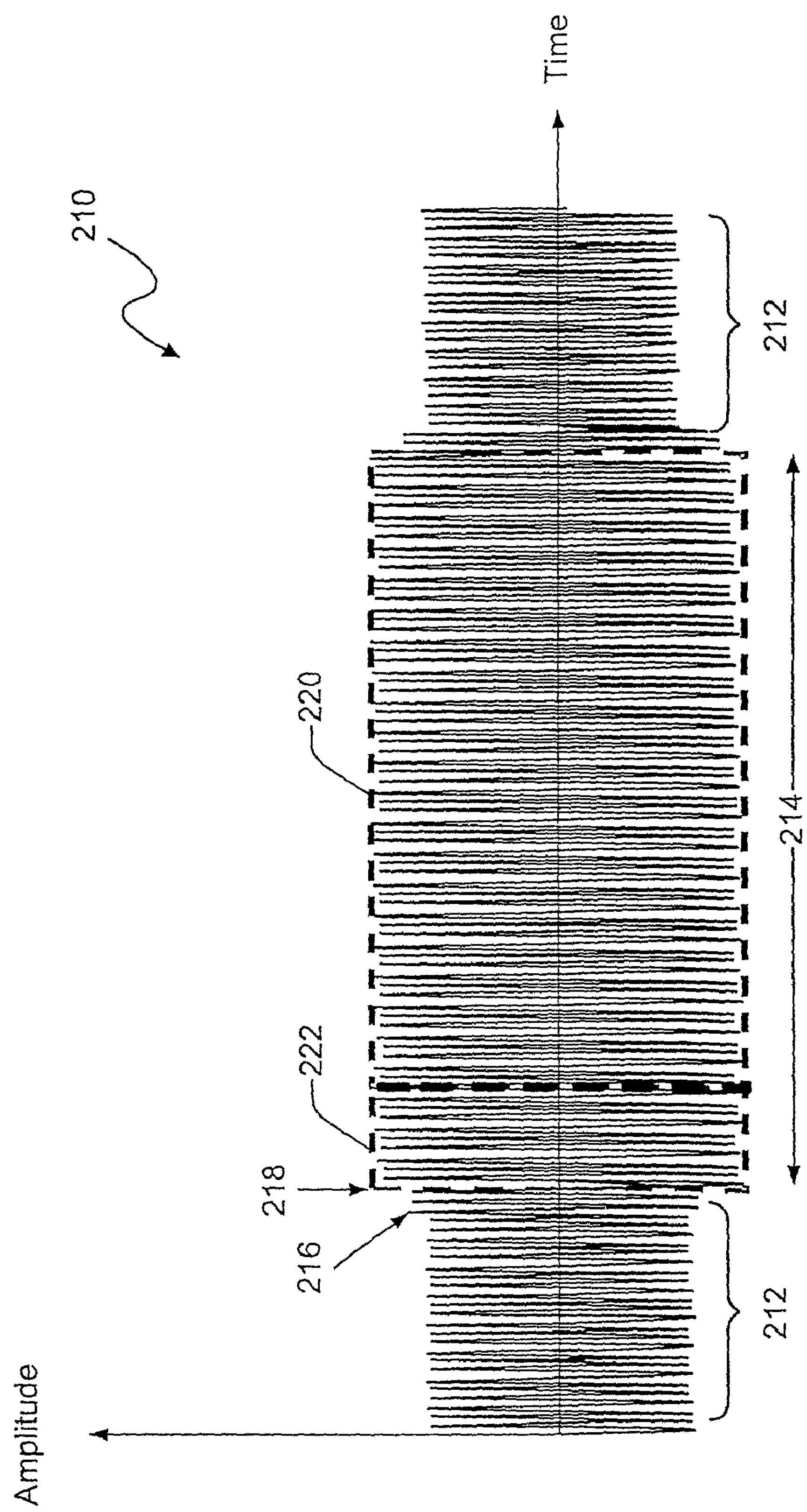
FIG. 2B illustrates a case where the quality of a signal waveform is severely degraded by noise introduced upon the signal channel.

FIG. 2B illustrates a case where the quality of a signal waveform 210 is severely degraded by noise (in portion 212) introduced upon the signal channel. This degradation causes reduction in the received signal strength (RSS) to reduce the peak-to-peak amplitude of the incoming data signal 220. Thus, in the illustrated figure, the waveform 210 includes portions where the amplitude of noise (in portion 212) in the idle channel may be comparable to the amplitude of the incoming data packet 220 (in portion 214). Hence, in this case, a false detect of a frame head 222 may occur, before the presence of an actual incoming data packet 220, for example, at 216. Moreover, the false detect at 216 may trigger a whole sequence of events such as attempting to find sync bits or frames, and to unpack data packet. This may cause the receiving modem to miss the actual incoming data packet 220, starting at 218.

Figure 3:
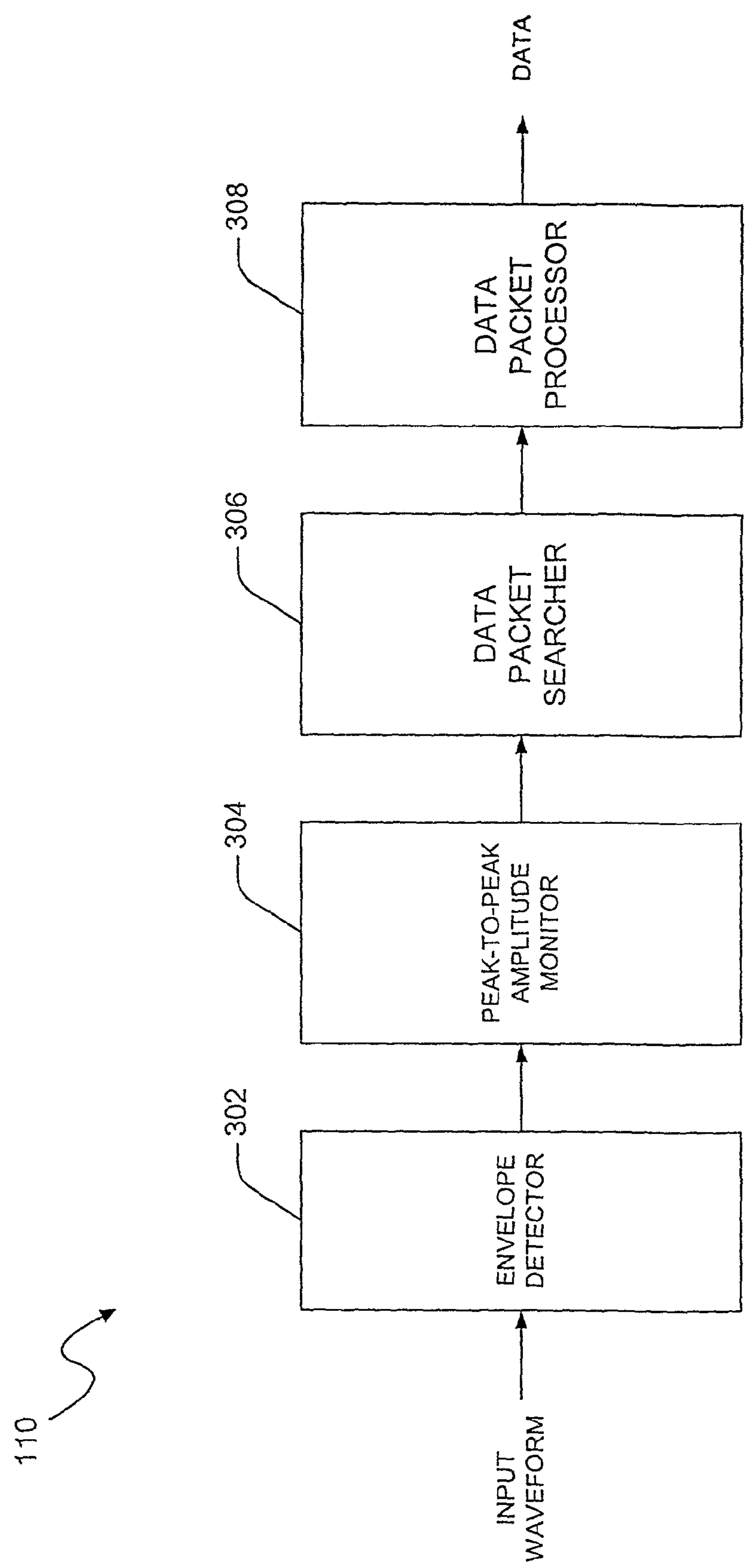
FIG. 3 illustrates a block diagram of a data carrier detector system according to one embodiment of the invention.

FIG. 3 illustrates the data carrier detector system 110 according to one embodiment of the invention. In the illustrated embodiment, the system 110 includes an envelope detector 302, a peak-to-peak amplitude monitor 304, a data packet searcher 306, and a data packet processor 308. The envelope detector 302 may be configured with any existing envelope detector that detects peaks and valleys to generate an envelope of the input data waveform. Thus, the envelope detector 302 provides peak-to-peak amplitude of the input waveform at any given time.

Figure 4:
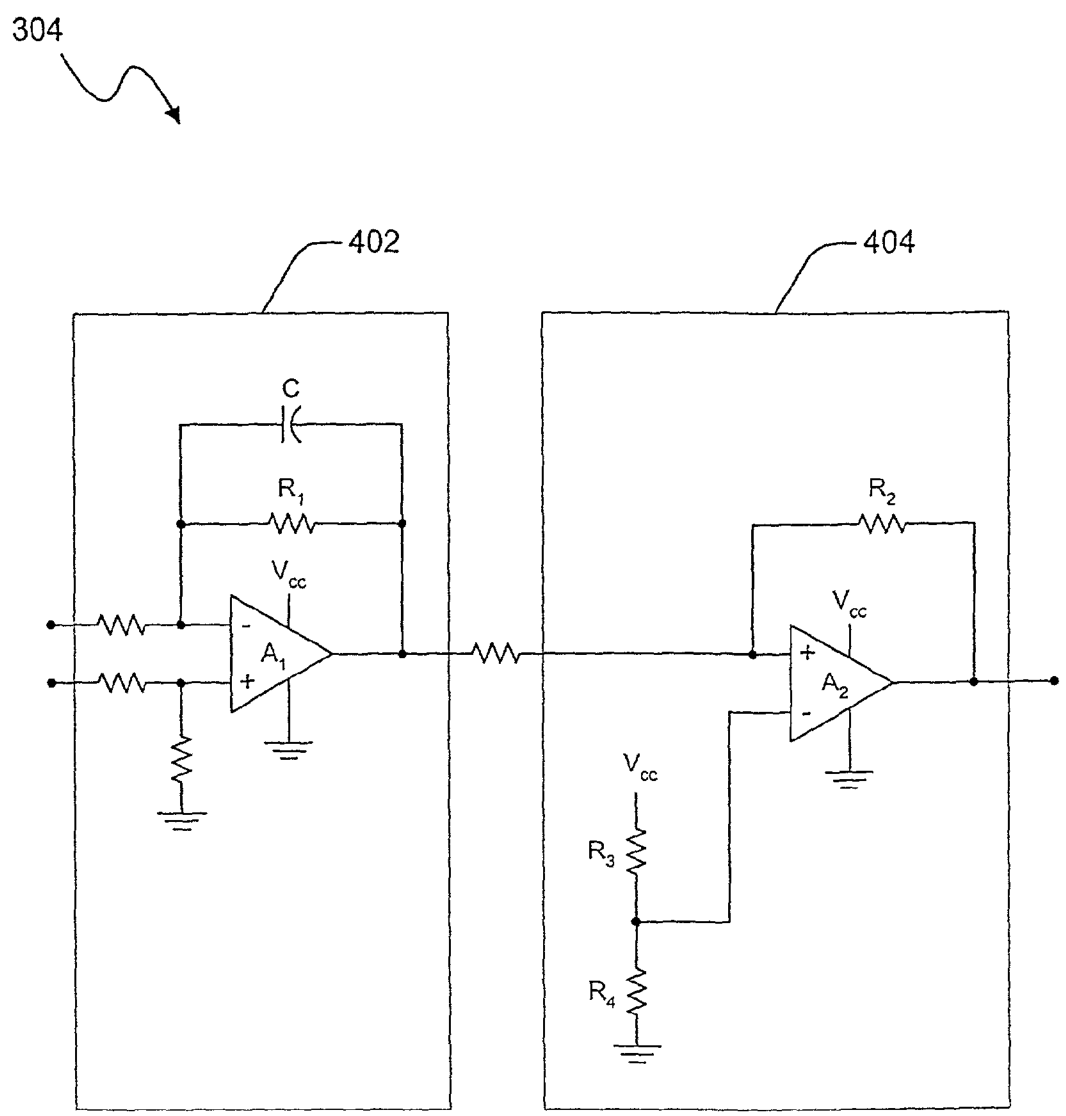
FIG. 4 shows a data carrier detector in accordance with an embodiment of the invention.

The peak-to-peak amplitude monitor 304 then monitors the peak-to-peak amplitude for change in the amplitude of a predetermined amount within a certain period of time. FIG. 4 shows a schematic diagram of the peak-to-peak amplitude monitor 304 according to one embodiment of the invention. In the illustrated embodiment, the amplitude monitor 304 comprises an integrator 402 and a hysteresis circuit 404 such as Schmitt trigger. The integrator 402 receives the envelope detector output and integrates the envelope waveform using op amp $A_1$ in combination with feedback elements C and $R_1$. The integrated waveform is then fed into the programmable hysteresis circuit 404 to determine the upper and lower trigger points of the hysteresis. Resistors $R_3$ and $R_4$, in conjunction with op-amp $A_2$ and resistor $R_2$, enable programming of the trigger points. In one embodiment, the peak-to-peak amplitude monitor 304 indicates that data has been detected when the envelope rises to approximately 55% of the nominal peak value. The amplitude monitor 304 indicates that no data is detected when the envelope falls to approximately 45% of the peak value. However, the indication of data detect and no data detect may be appropriately adjusted to any value.

In one embodiment, once the peak-to-peak amplitude monitor 304 indicates that data has been detected, the monitor 304 triggers the data packet searcher 306 to start searching for the start of the data packet, which may be indicated by a frame head. The data packet searcher 306 may be implemented with any conventional data packet searching mechanism.

In another embodiment, the peak-to-peak amplitude monitor 304 may be used to detect a quiet carrier. This situation may occur when the base station turns the transmitter on only when the base station sends packets. Hence, when no packet is being received, the amplitude of the envelope may be relatively large due to the presence of noise. However, when the quiet carrier is received, the peak-to-peak amplitude monitor 304 detects the amplitude of the collapsing envelope (e.g. at 45% of the peak) to indicate that the quiet carrier has been detected. This indication enables the detector system 110 to notify the modem/data pump 104 to reset presently executing operations, including a data decoding operation on a falsely detected packet, in preparation for the next probably genuine data detection signal.

Once the data packet searcher 306 receives the indication of data packet, the searcher 306 passes the information to the data packet processor 308 to process the received data packet. The processor 308 then extracts the data information from the packet. Again, an existing data packet processor design may be used to implement the data packet processor 308 of the illustrated embodiment.

Figure 5:
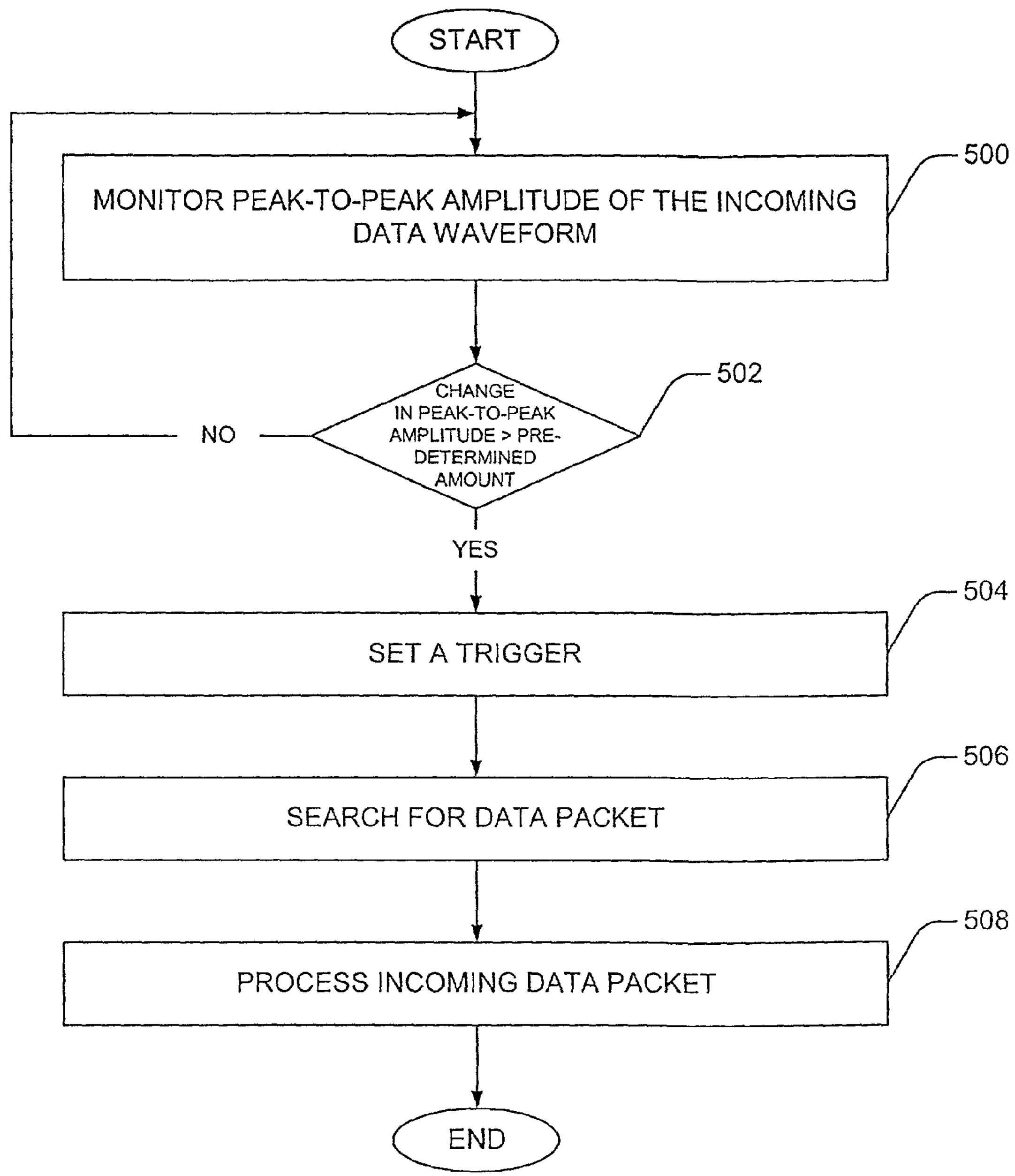
FIG. 5 is a flowchart illustrating an improved process for detecting incoming data packets in accordance with an embodiment of the invention.

FIG. 5 is a flowchart illustrating an improved process for detecting the presence of data packets in accordance with an embodiment of the invention. The process includes monitoring, at 500, peak-to-peak amplitude of the incoming data waveform. Peak-to-peak amplitude is then checked, at 502, to determine if the change in amplitude exceeds a predetermined amount. In one embodiment, the change in amplitude exceeds a predetermined amount when the peak-to-peak amplitude increases from a relatively low value to at least 55% of the peak value. In another embodiment, the change in amplitude exceeds a predetermined amount when the peak-to-peak amplitude decreases from a relatively high value to at least 45% of the peak value. If the amplitude change did not exceed the predetermined amount, the process returns to monitoring peak-to-peak amplitude, at 500. Otherwise, if the amplitude change exceeds the predetermined amount, a trigger is set, at 504, to enable data packet searching, at 506. Once the data packet is found, the incoming data packet is processed, at 508.

Referring back to FIG. 2A, when peak-to-peak amplitude of the waveform 200 between the idle channel 202 (i.e. the amplitude of the noise) and the incoming packetized data 208 changes by a predetermined amount (e.g. increasing to 55% or decreasing to 45% of the peak value), the process triggers a search for the incoming data packet.

Referring back to FIG. 2B, the process is kept in an idle state until the change in peak-to-peak amplitude reaches a certain predetermined amount, possibly at 216 or 218. In one embodiment, the process may then set a trigger to initiate a search for the incoming data packet by searching for a frame head 222. Until this trigger is set, a search for the incoming packetized data is not initiated. Thus, the process avoids triggering a whole sequence of events, at 216, and possibly missing the actual data packet at 218.

There has been disclosed herein embodiments for an improved method and system for detecting the difference between idle channel and incoming received data, designed for a mobile radio modem. The method and system is configured to substantially reduce the number of false detects of data packets by enabling the initiate to search after an increase in the peak-to-peak amplitude of the input waveform by a predetermined amount.

While specific embodiments of the invention have been illustrated and described, such descriptions have been for purposes of illustration only and not by way of limitation. Accordingly, throughout this detailed description, for the purposes of explanation, numerous specific details were set forth in order to provide a thorough understanding of the invention. It will be apparent, however, to one skilled in the art that the embodiments may be practiced without some of these specific details. Although the trigger was set at a predetermined amount of peak-to-peak amplitude, other parameters, such as time, may be used for the trigger. For example, the trigger may be set once the peak-to-peak amplitude changes by a predetermined amount within a specified time. In other instances, well-known structures and functions were not described in elaborate detail in order to avoid obscuring the subject matter of the invention. Accordingly, the scope and spirit of the invention should be judged in terms of the claims which follow.

What is claimed is:

1. A system, comprising:

an envelope detector to provide peak-to-peak amplitude of an incoming waveform at any given time;

a peak-to-peak amplitude monitor to monitor peak-to-peak amplitude, to determine an upper trigger and a lower trigger of the waveform, to set a trigger signal when the peak-to-peak amplitude exceeds the upper trigger and to deactivate the trigger signal when the peak-to-peak amplitude falls below the lower trigger;

a data packet searcher to start searching for a data packet when the peak-to-peak amplitude monitor issues the trigger; and a data packet processor to process and extract information from the recovered data packet.

2. The system of claim 1, wherein the peak-to-peak amplitude monitor includes:

an integrator to provide a slope of an envelope of the incoming waveform.

3. The system of claim 2, wherein the peak-to-peak amplitude monitor includes:

a hysteresis circuit operating to receive the slope of the envelope, and to provide the trigger signal.

4. The system of claim 1, wherein the trigger signal is activated when the peak-to-peak amplitude rises to a predetermined percentage of a peak value.

5. The system of claim 1, wherein the trigger signal is activated when the peak-to-peak amplitude falls to a predetermined percentage of a peak value.

6. A system, comprising:

means for determining peak-to-peak amplitude of an incoming waveform at any given time;

means for determining an upper trigger and a lower trigger of the waveform;

means for setting a trigger signal when the peak-to-peak amplitude exceeds the upper trigger;

means for searching for a data packet when the trigger signal is set;

means for deactivating the trigger signal when the peak-to-peak amplitude falls below the lower trigger; and means for processing and extracting information from the recovered data packet.

7. A system, comprising:

means for determining a peak amplitude of an incoming waveform;

means for determining an upper trigger and a lower trigger of the waveform;

means for setting a trigger signal when the peak-to-peak amplitude exceeds the upper trigger;

means for searching for a data packet when the trigger signal is set;

means for deactivating the trigger signal when the peak-to-peak amplitude falls below the lower trigger; and means for processing and extracting information from the recovered data packet.

8. The system of claim 7, wherein the trigger signal is set when the peak amplitude rises to at least 55% of a maximum value of the peak amplitude.

9. The system of claim 7, wherein the trigger signal is set when the peak amplitude falls to at least 45% of a maximum value of the peak amplitude.

10. A method, comprising:

determining peak-to-peak amplitude of an incoming waveform at any given time;

determining an upper trigger and a lower trigger of the waveform;

setting a trigger signal when the peak-to-peak amplitude exceeds the upper trigger;

searching for a data packet when the trigger signal is set;

deactivating the trigger signal when the peak-to-peak amplitude falls below the lower trigger; and processing and extracting information from the recovered data packet.

11. The method of claim 10, wherein the monitoring a change in the peak-to-peak amplitude includes providing a slope of an envelope of the incoming waveform.

12. The method of claim 11, wherein the monitoring a change in the peak-to-peak amplitude includes receiving the slope of the envelope, and providing the trigger signal.

13. The method of claim 10, wherein the determining peak-to-peak amplitude includes calculating a difference between a peak amplitude and a valley amplitude.

14. The method of claim 13, wherein the searching for a data packet includes searching and extracting a frame head.

15. The method of claim 13, wherein the processing and extracting information includes recovering data information from the data packet.

* * * * *